United States Patent [19]

Kuwahara et al.

[11] 4,023,656
[45] May 17, 1977

[54] WET TYPE BAND BRAKE APPARATUS

[75] Inventors: Toshikazu Kuwahara, Tsuzuki; Ryokichi Nishida, Hirakata; Kenji Kumagae, Tsuzuki, all of Japan

[73] Assignee: Kabushiki Kaisha Komatsu Seisakusho, Tokyo, Japan

[22] Filed: Dec. 12, 1975

[21] Appl. No.: 640,279

[30] Foreign Application Priority Data

Feb. 4, 1975 Japan .................... 50-015616

[52] U.S. Cl. ...................... 188/264 B; 188/77 R
[51] Int. Cl.² ........................... F16D 65/80
[58] Field of Search ......... 188/77 R, 264 B, 264 D, 188/264 E

[56] References Cited

UNITED STATES PATENTS

| | | | |
|---|---|---|---|
| 1,271,163 | 7/1918 | Hartford | 188/264 B |
| 1,592,846 | 7/1926 | Greenleaf | 188/264 B X |
| 1,707,987 | 4/1929 | Likas | 188/264 B X |
| 1,860,375 | 5/1932 | Winterer et al. | 188/264 B X |
| 1,882,037 | 10/1932 | Roberts | 188/264 B X |
| 3,044,736 | 7/1962 | Chambers | 188/264 E X |

*Primary Examiner*—Duane A. Reger
*Attorney, Agent, or Firm*—Armstrong, Nikaido & Marmelstein

[57] ABSTRACT

A wet type band apparatus characterized by the construction that, in the wet type band brake apparatus provided on the outer periphery of the brake drum with the lining fixed on the inner periphery of the brake band, a groove is cut on the contact surface of the lining in the peripheral direction, oil holes are perforated through the brake band and lining with their openings in the groove and at the same time, lubricating oil is supplied to the aforesaid oil holes and the discontinuous part located at the opening of the aforesaid brake band respectively.

3 Claims, 3 Drawing Figures

F I G. 1
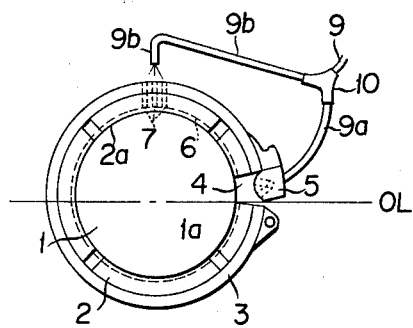
F I G. 2
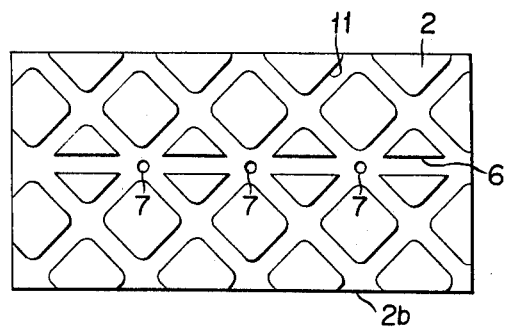
F I G. 3
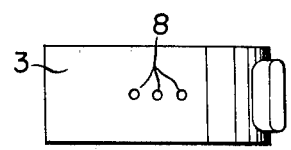

WET TYPE BAND BRAKE APPARATUS

BACKGROUND OF THE INVENTION

The present invention relates to a mechanism with which lubricating oil is supplied under pressure to the wet type band brake apparatus, especially to the contact surface of the brake drum and lining.

In the conventional wet type band brake apparatus, approximately a half of this apparatus is immersed in the lubricating oil, however, with the growth of braking force, abnormally high amount of contact heat is accumulated between the brake drum and lining and this heat causes a abnormally intensive wear of the lining, showing a disadvantage inherent to this type of brake apparatus.

To cope with this disadvantage, a rectifying device has been offered in which the frictional heat is subjected to cooling by means of supplying under pressure the lubricating oil between the brake drum and lining through the discontinuous part at the opening located at the extreme end of the brake band equipped with lining on its inner periphery, however, in this device, supply of the lubricating oil is concentrated in a single location only and accordingly, the cooling effect can not sufficiently be achieved because of inadequate supply of the lubricating oil between the brake drum and lining, showing another disadvantage accompanying this device.

SUMMARY OF THE INVENTION

It is, therefore, an object of the present invention to provide a wet type band brake apparatus free from the above mentioned disadvantages of the traditional type of band brake.

It is another object of the present invention to provide a wet type band brake apparatus in which a groove is provided on the periphery of a brake lining which catches a supplied oil through holes provided on the brake lining and a brake band mounted thereon to lubricate a space between the brake lining and a brake drum.

Other objects, features and advantages of the present invention will be readily apparent from the following description taken in conjunction with the accompanying drawings.

BRIEF DESCRIPTION OF THE DRAWINGS

FIG. 1 is a front elevation of the present invention;

FIG. 2 is a plan view of a lining of the present invention; and

FIG. 3 is a plan view of FIG. 1 showing a brake band of the present invention.

DETAILED DESCRIPTION OF THE PREFERRED EMBODIMENT

Referring to FIG. 1, on the outer peripheral surface 1a of the brake drum 1, the brake band 3 which is equipped with a plurality of units of lining 2 on the inner periphery is fixed and the brake band 3 is provided with a discontinuous part in its periphery and the discontinuous part 4 at the opening at the extreme end is provided with a nozzle 5 which confronts the opening.

On the other hand, on the brake drum contacting surface 2a of the lining 2 is provided with the groove 6 cut in the peripheral direction and parallel to the extreme edge 2b respectively.

Further, in the upper most position, that is to say, in the position most distant from the oil level OL of the brake band 3 and lining 2, are perforated a plurality of oil holes 7 in a continuous manner in such a manner that they open to the aforesaid groove 6.

9 represents a lubricating oil supply pipe which branches off by means of a two-way fitting 10 into the first and second lubricating oil supply pipes 9a and 9b respectively, the first lubricating oil supply pipe 9a being connected to a nozzle 5 and the second lubricating oil supply pipe 9b being positioned to open at the upper part of the oil hole 7 of the aforesaid brake band 3.

Referring to FIG. 2, the groove 6 is cut approximately in the middle of the brake lining 2 and the holes 7 open on the groove 6. 11 represent cross stripes grooves provided to effect uniform distribution all over the brake lining 2 of the oil supplied from the holes 7.

Referring to FIG. 3, 8 represent holes perforated in the brake band 3 and the brake lining 2 is mounted on the brake band 3 in such a manner that these holes 8 are positioned in perfect alignment with the holes 7 of the brake lining 2.

As the present invention is constructed in a manner as described above, an abundant supply of lubricating oil is provided to the contact surface between the brake drum 1 and lining 2, a portin of the contacting area which is not immersed in the oil can be freed from accumulation of frictional heat by cooling effect of the supplied oil preventing thus the abnormal wear of the lining 2 and at the same time, development of cracks originated from heat fatigue of the brake drum 1 can also be prevented.

Further, on the contacting surface 2a of the lining 2 with the brake drum is cut a groove 6 in the peripheral direction and the groove 6 receives lubricating oil through the oil holes 7 and accordingly, as adequate supply of the lubricating oil is provided to the contact area between the brake drum 1 and lining 2, a portion of the contact area which is not immersed in the oil can be subjected to thorough cooling of the frictional heat and the abnormal abrasion of the lining 2 can be prevented in a more assured manner and at the same time, development of cracks originated from thermal fatigue of the brake drum 1 can also be prevented in a more assured manner.

Further, in a practical example embodying the present invention, as the oil holes 7 are perforated in the top most positions farthest from the oil level OL, the lubricating oil is supplied directly to the area where the greatest amount of frictional heat is generated, thus providing the most effective cooling effects to the area where the frictional heat is generated.

What is claimed is:

1. A wet type band brake apparatus comprising a brake drum, a brake lining mounted on the periphery of said brake drum, said brake lining having a groove along the entire circumference of the contact surface thereof and a hole passing through said lining into said groove to introduce oil therethrough, a brake band mounted on the periphery of said brake lining, said brake band having a hole therein aligned with the hole in said brake lining to introduce oil therethrough, an inlet port for oil positioned at a discontinuous portion of said brake lining and said brake band and, means for introducing oil into said hole in said brake band and said inlet port whereby oil flows through said hole in said brake lining, into said groove and then onto the contact surface of said brake lining thereby cooling friction heat caused by braking action.

2. A wet type band brake apparatus of claim 1, wherein said brake lining has a plurality of crossed grooves thereon.

3. A wet type band brake apparatus of claim 1, wherein the holes in said brake lining and said brake band are positioned at the top portion thereof when mounted to a vehicle.

* * * * *